(12) United States Patent
Gallagher et al.

(10) Patent No.: US 8,132,317 B2
(45) Date of Patent: Mar. 13, 2012

(54) APPARATUS FOR MANUFACTURE OF ELECTRONIC ASSEMBLIES

(75) Inventors: Niall Gallagher, Cambridge (CA); Ted Toth, Kitchener (CA)

(73) Assignee: Research In Motion Limited, Waterloo (CA)

( * ) Notice: Subject to any disclaimer, the term of this patent is extended or adjusted under 35 U.S.C. 154(b) by 193 days.

(21) Appl. No.: 11/761,118

(22) Filed: Jun. 11, 2007

(65) Prior Publication Data
US 2008/0301930 A1 Dec. 11, 2008

(51) Int. Cl.
*H05K 3/30* (2006.01)
(52) U.S. Cl. ........... 29/740; 29/741; 29/742; 198/346.2; 198/502.2
(58) Field of Classification Search ............ 29/740–743, 29/759, 832–836, 564.1–564.4, 33 K, 33 P; 198/345.3, 346.2–346.3, 341, 345, 817, 502.2; 414/752.1, 751.1, 224.04
See application file for complete search history.

(56) References Cited

U.S. PATENT DOCUMENTS

| | | | | | |
|---|---|---|---|---|---|
| 3,668,750 | A | * | 6/1972 | McAllister et al. | 29/33 M |
| 4,011,155 | A | * | 3/1977 | Feurstein et al. | 209/3.1 |
| 4,441,003 | A | * | 4/1984 | Eves et al. | 219/700 |
| 4,725,182 | A | * | 2/1988 | Sakamoto et al. | 414/331.02 |
| 5,208,969 | A | * | 5/1993 | Hidese | 29/740 |
| 5,359,154 | A | * | 10/1994 | Tsukasa et al. | 177/145 |
| 5,495,661 | A | * | 3/1996 | Gromer et al. | 29/740 |
| 5,517,748 | A | * | 5/1996 | Park | 29/741 |
| 5,573,174 | A | * | 11/1996 | Pekol | 228/219 |
| 5,778,524 | A | * | 7/1998 | Stridsberg | 29/740 |
| 5,845,392 | A | * | 12/1998 | Cardini et al. | 29/736 |
| 5,949,031 | A | * | 9/1999 | Vande Berg | 177/16 |
| 6,005,211 | A | | 12/1999 | Huang et al. | |
| 6,643,917 | B1 | * | 11/2003 | Gieskes | 29/740 |
| 6,944,943 | B2 | * | 9/2005 | Cho et al. | 29/740 |
| 7,036,213 | B2 | * | 5/2006 | Kabeshita et al. | 29/740 |
| 7,222,738 | B1 | * | 5/2007 | Stockard | 209/552 |
| 2007/0246071 | A1 | * | 10/2007 | Streb | 134/18 |

FOREIGN PATENT DOCUMENTS

| | | |
|---|---|---|
| DE | 19617537 C1 | 7/1997 |
| EP | 0 137 066 | 4/1985 |
| JP | 8081049 | 3/1996 |
| JP | 2003110000 | 4/2003 |

OTHER PUBLICATIONS

European Search Report; European Patent Office; Nov. 5, 2007; 7 pages.
Canadian Office Action, Application No. 2,634,852, Canadian Intellectual Property Office, dated Jan. 8, 2010, 3 pgs.
CIPO, Office Action, Application No. 2,634,852, Feb. 25, 2011, 3 pgs.

* cited by examiner

*Primary Examiner* — Minh Trinh
(74) *Attorney, Agent, or Firm* — The Danamraj Law Group, P.C.

(57) ABSTRACT

A electronic apparatus manufacturing cell defining an electronic apparatus manufacturing cell envelope having a first side and having a second side opposite the first side. According to one aspect, the electronic apparatus manufacturing cell comprises an infeed conveyor, a pass conveyor and a reject conveyor. The infeed conveyor extends from a point outside of the electronic apparatus manufacturing cell envelope on the first side to a point inside of the envelope. The pass conveyor extends from a point inside the electronic apparatus manufacturing cell envelope to a point outside of the electronic apparatus manufacturing cell envelope on the second side. The reject conveyor extends from a point inside the electronic apparatus manufacturing cell envelope to a point outside of the electronic apparatus manufacturing cell envelope on the first side.

8 Claims, 7 Drawing Sheets

APPARATUS FOR MANUFACTURE OF ELECTRONIC ASSEMBLIES

TECHNICAL FIELD OF THE APPLICATION

The present disclosure generally relates to manufacturing of electronic apparatuses. More particularly, and not by way of any limitation, the present disclosure is directed to a manufacturing cell designed to optimize space within a manufacturing facility.

BACKGROUND

Despite significant advances in manufacturing technology, assembly and testing of electronic assemblies require the use of equipment consuming substantial quantities of factory floor space. Testing and characterization of electronic assemblies, for example, generally requires physically large machines, each of which consumes significant floor space within a factory. It is, therefore, desirable to minimize the size and complexity of electronic apparatus manufacturing cells, including electronic assembly testing cells.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

An apparatus of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

According to a first aspect, the present disclosure relates to an electronic apparatus manufacturing cell defining an electronic apparatus manufacturing cell envelope having a first side and having a second side opposite the first side. The electronic apparatus manufacturing cell comprises an infeed conveyor extending from a point outside of the electronic apparatus manufacturing cell envelope on the first side to a point inside of the envelope and a pass conveyor, parallel to the infeed conveyor, extending from a point inside the electronic apparatus manufacturing cell envelope to a point outside of the electronic apparatus manufacturing cell envelope on the second side.

According to a second aspect, the present disclosure relates to an electronic apparatus manufacturing cell defining an electronic apparatus manufacturing cell envelope having a first side and having a second side opposite the first side. The electronic apparatus manufacturing cell comprises an infeed conveyor extending from a point outside of the electronic apparatus manufacturing cell envelope on the first side to a point inside of the envelope, a pass conveyor, parallel to the infeed conveyor, extending from a point inside the electronic apparatus manufacturing cell envelope to a point outside of the electronic apparatus manufacturing cell envelope on the second side and a reject conveyor, parallel to the infeed conveyor, extending from a point inside the electronic apparatus manufacturing cell envelope to a point outside of the electronic apparatus manufacturing cell envelope on the first side.

According to a third aspect, the present disclosure relates to an electronic apparatus manufacturing cell defining an electronic apparatus manufacturing cell envelope having a first side and having a second side opposite the first side. The electronic apparatus manufacturing cell comprises an infeed conveyor extending from a point outside of the electronic assembly manufacturing cell envelope on the first side to a point inside of the envelope, a pass conveyor, parallel to the infeed conveyor and disposed adjacent to the infeed conveyor, extending from a point inside the electronic apparatus manufacturing cell envelope to a point outside of the electronic apparatus manufacturing cell envelope on the second side and a reject conveyor, parallel to the infeed conveyor and disposed adjacent to the infeed conveyor opposite the pass conveyor, extending from a point inside the electronic apparatus manufacturing cell envelope to a point outside of the electronic apparatus manufacturing cell envelope on the first side.

Figure 1:
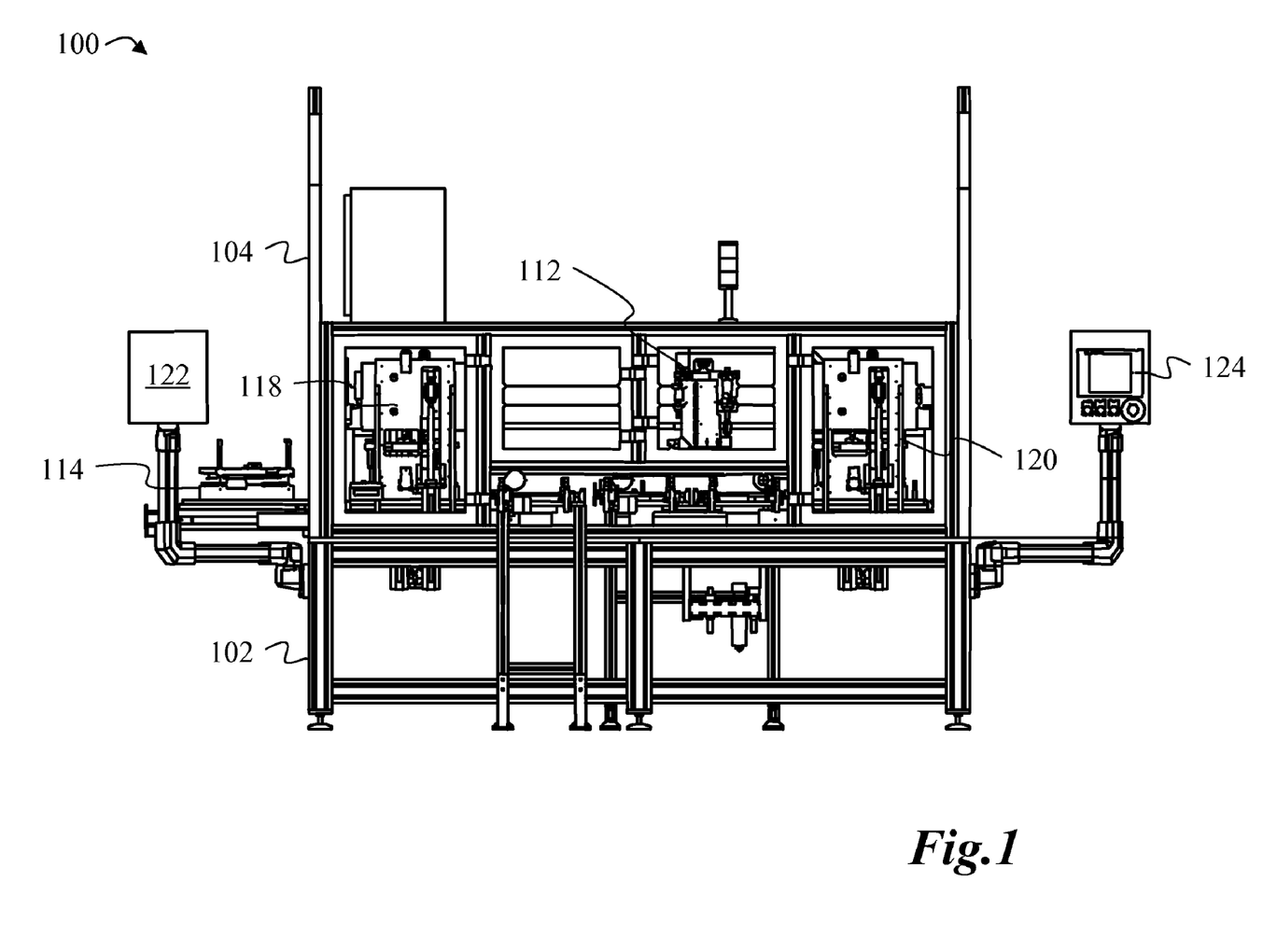
FIG. 1 is a front view of an electronic apparatus manufacturing cell.
Figure 2:
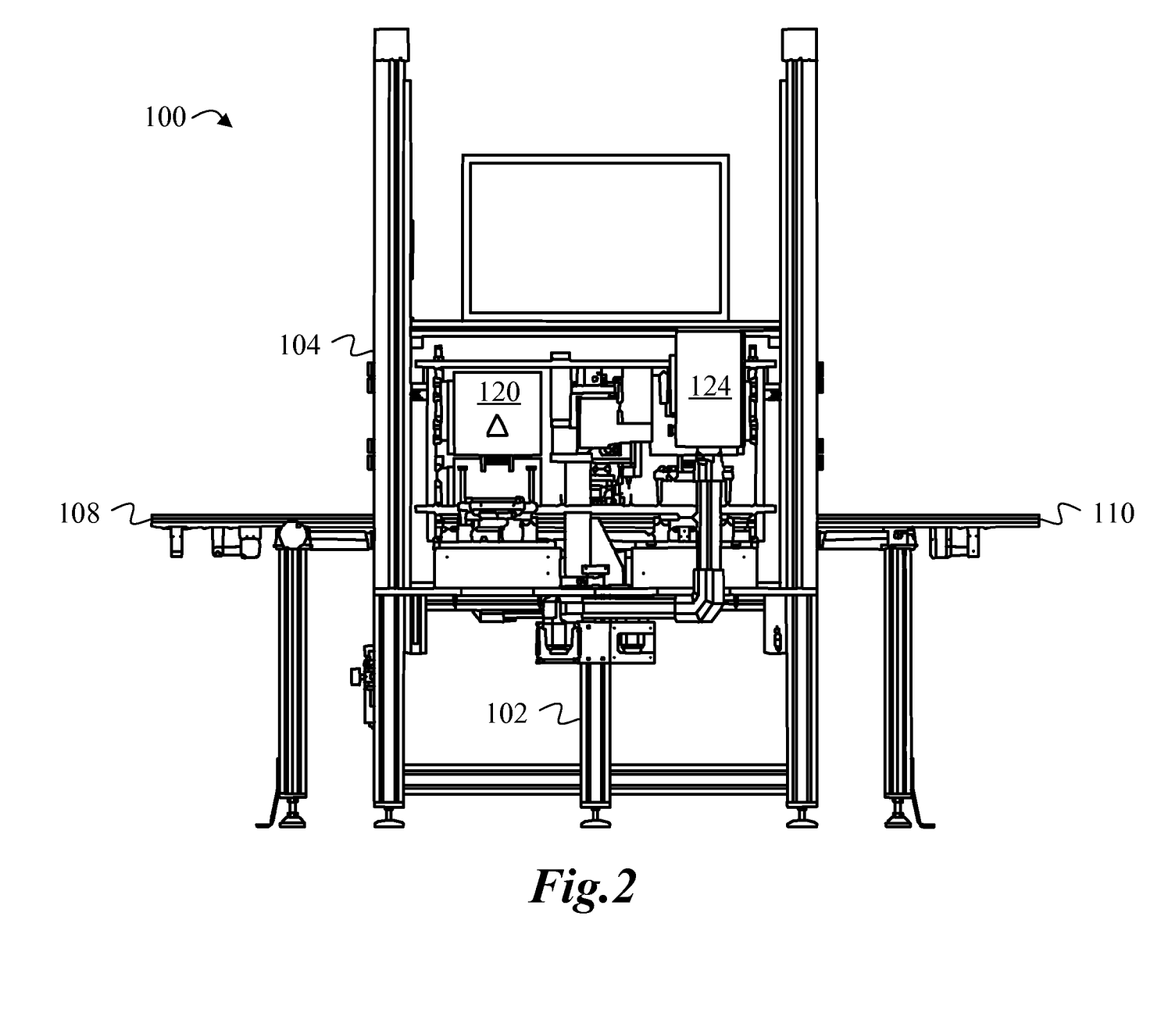
FIG. 2 is an end view of the electronic apparatus manufacturing cell.
Figure 3:
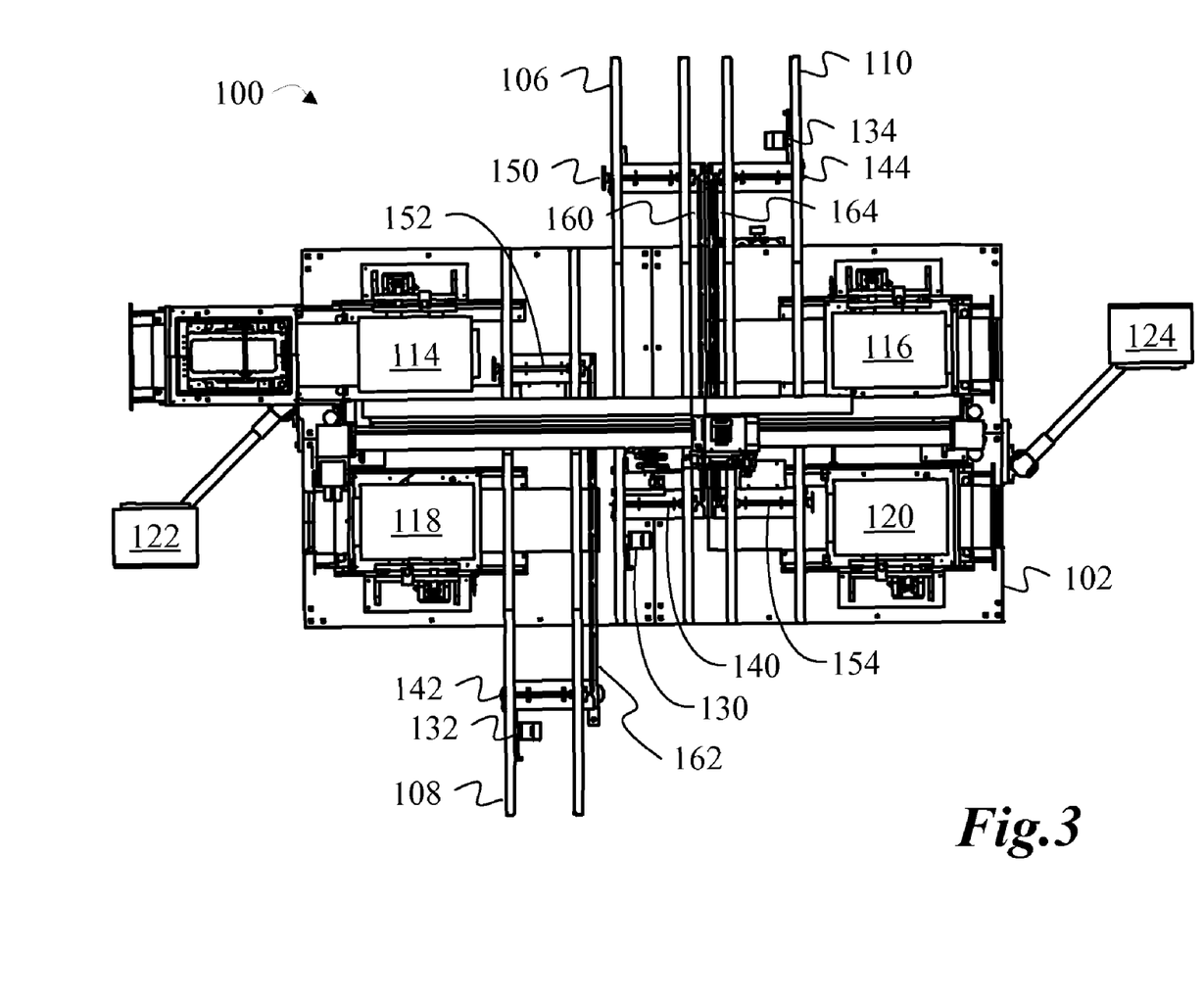
FIG. 3 is an overhead plan view of the electronic apparatus manufacturing cell.

FIGS. 1-3 depict a electronic apparatus manufacturing cell 100 having a lower frame 102 and an upper frame 104. Lower frame 102 supports an infeed conveyor 106, a pass conveyor 108 and a reject conveyor 110. A transfer robot 112 is disposed above conveyors 106, 108, 110 and is equipped with an end effector suitable for apprehending an electronic apparatus undergoing processing and transferring it from one of conveyors 106, 108, 110 to another of conveyors 106, 108, 110. Although the present disclosure is presented in connection with an electronic apparatus testing cell for purposes of illustration, those of skill in the art will appreciate that the present disclosure will apply in like manner to a variety of other types of electronic apparatus manufacturing cells.

The determination as to the destination conveyor for an electronic apparatus undergoing processing may be made according to the results of tests performed using one or more of stations 114, 116, 118, 120. An electronic apparatus is brought into the electronic apparatus manufacturing cell 100 on infeed conveyor 106, processed using one or more of stations 114, 116, 118, 120, and then transferred to the appropriate outfeed conveyor according to the outcome of the processing. An electronic apparatus successfully passing through one or more processes performed at one or more of stations 114, 116, 118, 120 may be transferred to pass conveyor 108 and transferred to the next cell in the manufacturing facility. An electronic apparatus unsuccessfully completing one or more processes performed at one or more of stations 114, 116, 118, 120 may be transferred to reject conveyor 110 and transferred to the previous cell in the manufacturing facility. In certain embodiments, all of stations 114, 116, 118, 120 may be testing stations. In other embodiments, all of stations 114, 116, 118, 120 may be manufacturing stations. Other embodiments may incorporate a combination of manufacturing stations and testing stations, and certain stations may combine manufacturing capability and testing capability in a single station.

In certain embodiments, an electronic apparatus may be processed at a first station 114, 116, 118, 120 and then moved to a second station 114, 116, 118, 120 or a conveyor 108, 110 within electronic apparatus manufacturing cell 100 according to the outcome of the processing at the first station 114, 116, 118, 120. An assembly may, for example, be initially moved to station 114, where testing is performed on the assembly. If the testing is successful, the assembly may be moved to station 116 for additional testing or other processing. If the testing is unsuccessful, the assembly may be moved to station 118 for further testing or placed on reject conveyor 110. A wide variety of other possibilities will be apparent to those of skill in the art.

In certain embodiments, all assemblies passing through electronic apparatus manufacturing cell 100 must pass through each of stations 114, 116, 118, 120 for processing before proceeding to the next cell in the line. In other embodiments, stations 114, 116, 118, 120 are identical to one another, and assemblies are moved to stations 114, 116, 118, 120 according to which of stations 114, 116, 118, 120 are available at a given time. In certain embodiments, stations 114, 116, 118, 120 are specific to certain assembly designs, and an electronic apparatus may be moved to one or more stations 114, 116, 118, 120 within electronic apparatus manufacturing cell 100 according to the type or model of the electronic apparatus. With this capability, a variety of types of electronic apparatuses may be processed within a single apparatus.

Electronic apparatus manufacturing cell 100 interacts with its human operators via operator interface panels 122 and 124. Generally, operator interface panels 122 and 124 will incorporate visual displays and operator input controls such as those shown on operator interface panel 124 in FIG. 1. Operator interface panels 122 and 124 may also incorporate audio outputs in order to capture the operator's attention when the operator is not looking at the visual display.

Each of conveyors 106, 108, 110 has the same general construction and each of conveyors 106, 108, 110 is driven independently by a single conveyor motor 130, 132, 134, respectively. Each conveyor motor 130, 132, 134 powers a driving jackshaft 140, 142, 144, respectively. Each driving jackshaft 140, 142, 144 drives a driven jackshaft 150, 152, 154 through a drive belt 160, 162, 164. Together, each pair of driving jackshafts 140, 142, 144 and driven jackshafts 150, 152, 154 impels the payload interface surface (not shown) for each conveyor 106, 108, 110. The payload interface surface may vary by application, but will generally be a belt, chain or cable.

Figure 4:
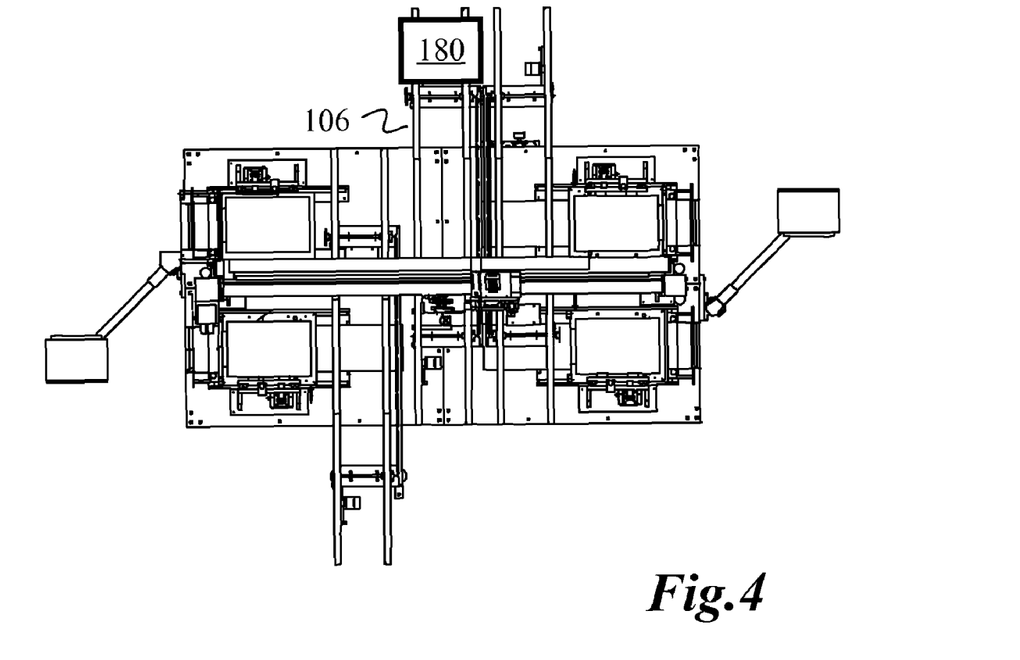
FIG. 4 is an overheard plan view of the electronic apparatus manufacturing cell showing an electronic apparatus at the entry end of the infeed conveyor.
Figure 5:
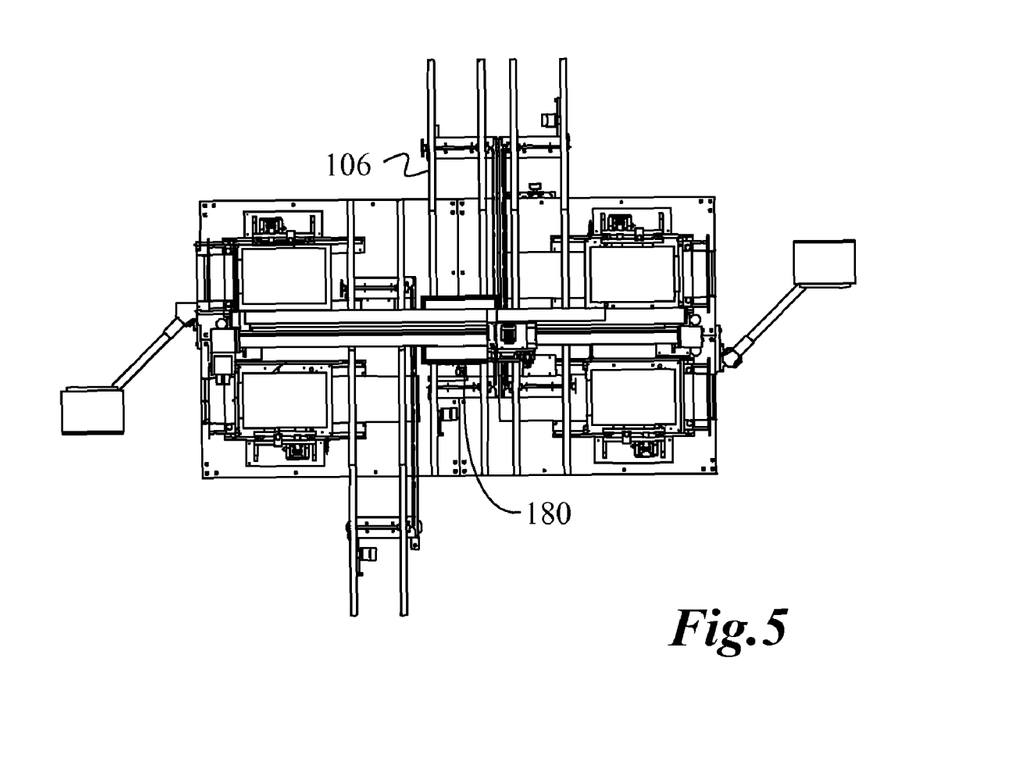
FIG. 5 is an overheard plan view of the electronic apparatus manufacturing cell showing a electronic apparatus at the exit end of the infeed conveyor.

FIGS. 4 and 5 depict an electronic apparatus 180 entering electronic apparatus manufacturing cell 100 on infeed conveyor 106. In FIG. 4, the electronic apparatus 180 is disposed at the entry end of infeed conveyor 106. In normal operation, infeed conveyor 106 will draw electronic apparatus 180 into the central portion of electronic apparatus manufacturing cell 100, where it can be processed. FIG. 5 shows the position of the electronic apparatus 180 after infeed conveyor 106 has been powered to draw electronic apparatus into the central portion of electronic apparatus manufacturing cell 100.

Those of skill in the art will note that electronic apparatus 180 is shown as being generally rectangular, having a longer dimension disposed perpendicularly to the direction of travel of conveyors 106, 108, 110. Alternate embodiments may be designed to accept electronic apparatuses having their longer dimension disposed parallel to the direction of conveyor travel or in some other orientation. Certain embodiments may incorporate a transfer robot 112 having the capability to reorient electronic apparatuses about one or more axes, thereby removing any necessity that the orientation of the incoming electronic apparatuses match the orientation of the stations 114, 116, 118, 120. In one such embodiment, electronic apparatuses such as electronic apparatus 180 may enter electronic apparatus manufacturing cell 100 oriented with their longer axis aligned to the direction of travel of the conveyors, then reoriented by transfer robot 112 to a different orientation matching the orientation of one of stations 114, 116, 118, 120. Subsequent to processing by that station, transfer robot 112 may again reorient electronic apparatus 180 to an orientation matching a different one of stations 114, 116, 118, 120 or one of conveyors 16, 108, 110. In the illustrated embodiment, for example, assemblies entering electronic apparatus manufacturing cell 100 could enter oriented with their longer axis aligned to the direction of travel of the conveyors. In this case, they may not be properly oriented to interface with stations 114, 116, 118 120, which are oriented to interface with assemblies having their longer dimension disposed orthogonally to the direction of travel of the conveyors. In such a case, it would be necessary to reorient the assemblies 90 degrees about the vertical axis in order to insert them into one of stations 114, 116, 118, 120. If the assemblies are reoriented in this manner, it may then be necessary to reorient them after processing but prior to placement on one of conveyors 106, 108, 110. As above, a wide variety of possibilities will be apparent to those of skill in the art.

After the electronic apparatus 180 is drawn into the electronic apparatus manufacturing cell 100 on infeed conveyor 106, the electronic apparatus is processed using one or more of stations 114, 116, 118, 120. After the processing is complete, a determination may be made as to whether electronic apparatus 180 should be forwarded to the next manufacturing cell via pass conveyor 108 or returned to the prior manufacturing cell via reject conveyor 110. After this determination is made, transfer robot 112 is actuated to move the electronic apparatus to the appropriate outfeed conveyor 108 or 110.

Figure 6:
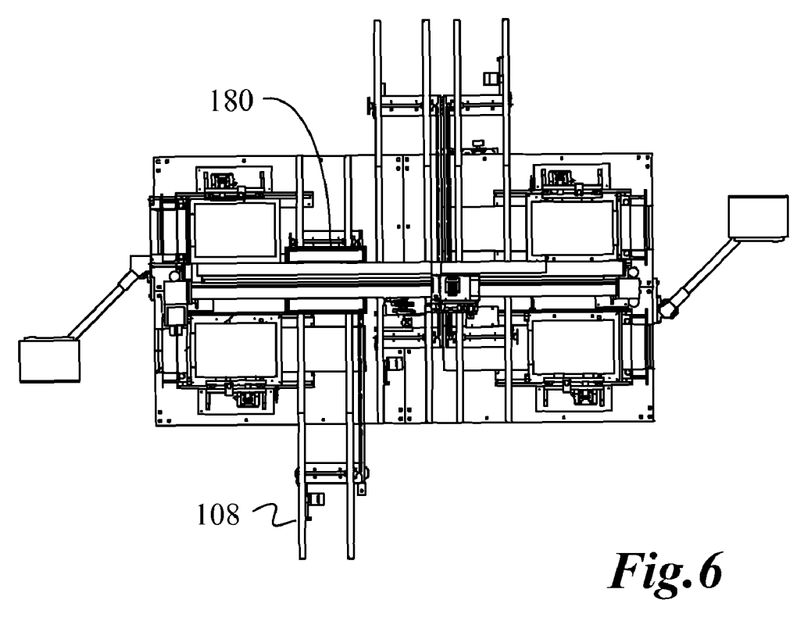
FIG. 6 is an overheard plan view of the electronic apparatus manufacturing cell showing a electronic apparatus at the entry end of the pass conveyor.
Figure 7:
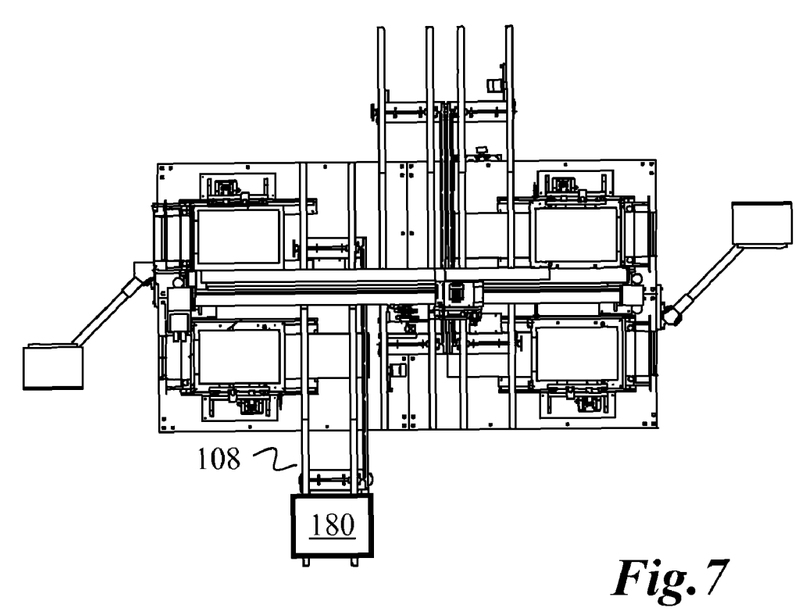
FIG. 7 is an overheard plan view of the electronic apparatus manufacturing cell showing an electronic apparatus at the exit end of the pass conveyor.

FIGS. 6 and 7 show an electronic apparatus 180 disposed on pass conveyor 108. In FIG. 6, the electronic apparatus 180 has been placed on pass conveyor 108 for transfer to the next manufacturing cell. FIG. 7 shows the position of electronic apparatus 180 after pass conveyor 108 has been actuated in order to transfer electronic apparatus 180 to the next manufacturing cell.

Figure 8:
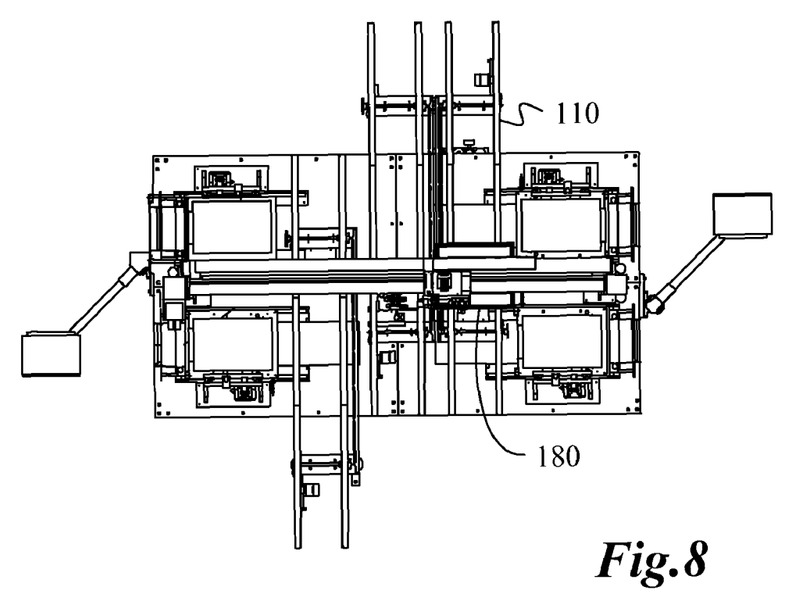
FIG. 8 is an overheard plan view of the electronic apparatus manufacturing cell showing an electronic apparatus at the entry end of the reject conveyor.
Figure 9:
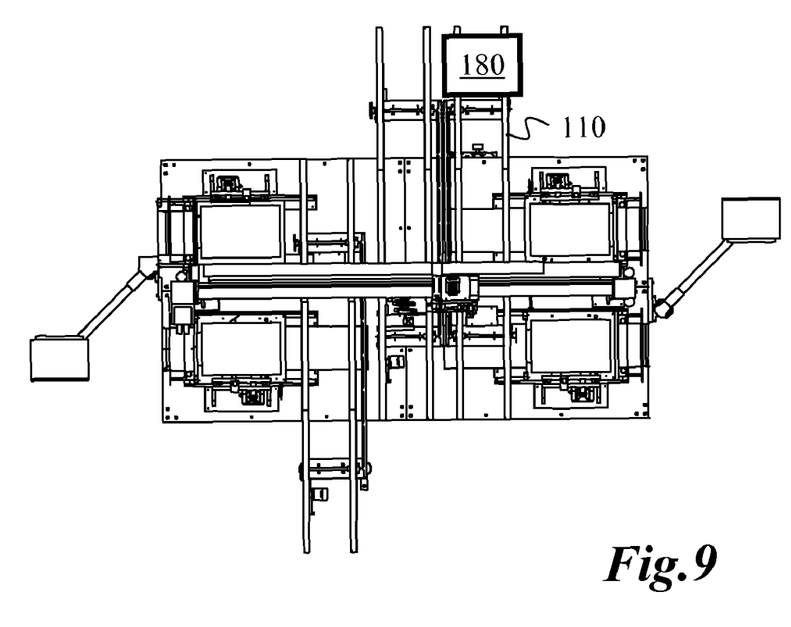
FIG. 9 is an overheard plan view of the electronic apparatus manufacturing cell showing an electronic apparatus at the exit end of the reject conveyor.

FIGS. 8 and 9 show an electronic apparatus 180 disposed on pass conveyor 108. In FIG. 8, the electronic apparatus 180 has been placed on reject conveyor 110 for transfer to the previous manufacturing cell. FIG. 9 shows the position of electronic apparatus 180 after reject conveyor 110 has been actuated in order to transfer electronic apparatus 180 to the previous manufacturing cell in the manufacturing line.

Figure 10:
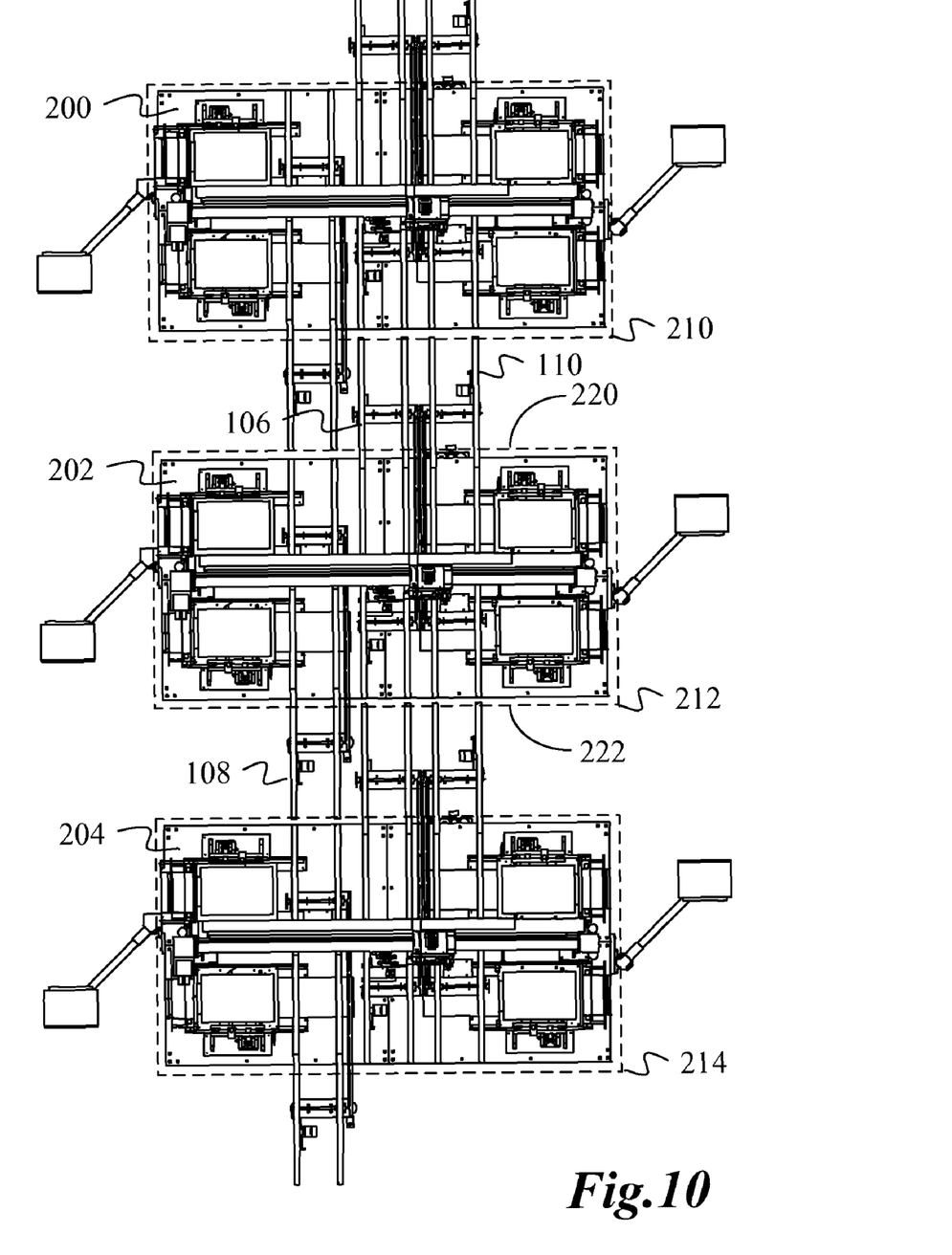
FIG. 10 is an overhead plan view of a set of three electronic apparatus manufacturing cells arranged in series.

Those of skill in the art will note that conveyors 106, 108, 110 of each cell 100 extend well beyond the envelopes of a cell defined by the boundaries of frames 102 and 104. This design allows electronic apparatus manufacturing cell 100 to be disposed immediately adjacent to the manufacturing cells disposed before and after electronic apparatus manufacturing cell 100 without the need for intermediate conveyor units between the cells. FIG. 10 shows a set of three processing cells 200, 202, 204 disposed immediately adjacent to one another. The frames 102 and 104 of cells 200, 202, 204 define rectangular envelopes 210, 212, 214, respectively. The conveyors 106, 108, 110 of each cell 200, 202, 204 extend through the envelope 210, 212, 214 for the cell 200, 202, 204 to the adjacent cell 200, 202, 204. Conveyors 106 and 110 of cell 202, for example, extend through side 220 of envelope 212 and up to envelope 210 of cell 200. Conveyor 108 of cell 202 extends through side 222 of envelope 212 and up to envelope 214 of cell 204. It can be seen that no additional intermediate conveyors are necessary in order to transfer electronic components between processing cells 200, 202, 204.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. An electronic apparatus manufacturing cell, the cell comprising:
    a lower frame;
    an upper frame supported by the lower frame, the upper frame comprising at least a first side and a second opposing side, the first side and second opposing side of the upper frame together defining boundaries of a cell envelope;
    an infeed conveyor supported on the lower frame and having a first end situated outside of the cell envelope beyond the first side of the upper frame, and a second end situated inside the cell envelope and proximal to the second opposing side of the upper frame;
    a pass conveyor supported by the lower frame and situated parallel and adjacent to the infeed conveyor, the pass conveyor having a first end situated inside the cell envelope and proximal to the first side of the upper frame, and a second end situated outside of the cell envelope beyond the second opposing side of the upper frame;
    at least one processing station for processing an electronic apparatus within the manufacturing cell; and
    means for transferring the electronic apparatus between the infeed conveyor, the at least one processing station, and the pass conveyor.

2. The electronic apparatus manufacturing cell according to claim 1 wherein the processing unit is a testing station for the electronic apparatus.

3. The electronic apparatus manufacturing cell according to claim 1 wherein the means for transferring an electronic apparatus between the infeed conveyor, the at least one processing station, and the pass conveyor comprises an actuator having an end effector secured thereto.

4. The electronic apparatus manufacturing cell according to claim 3 further comprising at least one additional processing station.

5. The electronic apparatus manufacturing cell according to claim 4 wherein the actuator is further operable to move the electronic apparatus between the at least one processing station and at least one additional processing station.

6. The electronic apparatus manufacturing cell according to claim 1 wherein the first side and second opposing side of the upper frame have generally-rectangular geometries.

7. The electronic apparatus manufacturing cell according to claim 1 further comprising a reject conveyor supported by the lower frame and situated parallel and adjacent to the infeed conveyor, the reject conveyor having a first end situated inside the cell envelope and proximal to the second opposing side of the upper frame, and a second end situated outside of the cell envelope beyond the first side of the upper frame.

8. The electronic apparatus manufacturing cell according to claim 7 wherein the infeed conveyor and the reject conveyor are coupled to a first adjacent manufacturing cell and the pass conveyor is coupled with a second adjacent manufacturing cell.

\* \* \* \* \*

UNITED STATES PATENT AND TRADEMARK OFFICE
CERTIFICATE OF CORRECTION

| | | |
|---|---|---|
| PATENT NO. | : 8,132,317 B2 | |
| APPLICATION NO. | : 11/761118 | |
| DATED | : March 13, 2012 | |
| INVENTOR(S) | : Niall Gallagher and Ted Toth | |

It is certified that error appears in the above-identified patent and that said Letters Patent is hereby corrected as shown below:

Column 1,
Line 36, "overheard" should read --overhead--.

Column 1,
Line 39, "overheard" should read --overhead--.

Column 1,
Line 42, "overheard" should read --overhead--.

Column 1,
Line 45, "overheard" should read --overhead--.

Column 1,
Line 48, "overheard" should read --overhead--.

Column 1,
Line 51, "overheard" should read --overhead--.

Column 4,
Line 28, "118 120" should read --118, 120--.

Signed and Sealed this
Fifteenth Day of May, 2012

David J. Kappos
*Director of the United States Patent and Trademark Office*